(12) United States Patent
Zimmer et al.

(10) Patent No.: US 12,508,721 B2
(45) Date of Patent: Dec. 30, 2025

(54) DISCONNECTABLE ADAPTER AND METHOD FOR DISCONNECTION

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 658 days.

(21) Appl. No.: 17/924,787

(22) PCT Filed: May 12, 2021

(86) PCT No.: PCT/DE2021/000090
§ 371 (c)(1),
(2) Date: Feb. 11, 2023

(87) PCT Pub. No.: WO2021/228297
PCT Pub. Date: Nov. 18, 2021

(65) Prior Publication Data
US 2023/0202055 A1    Jun. 29, 2023

(30) Foreign Application Priority Data

May 13, 2020   (DE) ...................... 10 2020 002 859.4

(51) Int. Cl.
*B25J 15/04*    (2006.01)
(52) U.S. Cl.
CPC ....... *B25J 15/0433* (2013.01); *B25J 15/0408* (2013.01)
(58) Field of Classification Search
CPC .................... B25J 15/0433; B25J 15/0408
See application file for complete search history.

(56) References Cited

U.S. PATENT DOCUMENTS

| 5,040,915 | A | * | 8/1991 | Stuart | .................... B23K 9/287 414/730 |
| 5,782,571 | A | | 7/1998 | Hufford et al. | |
| 7,806,395 | B2 | * | 10/2010 | Wieland | ................ B25B 1/2405 269/139 |
| 11,485,010 | B2 | * | 11/2022 | Zimmer | .................... B25J 9/08 |
| 11,679,512 | B2 | * | 6/2023 | Son | ...................... B25J 15/0408 483/58 |

(Continued)

FOREIGN PATENT DOCUMENTS

| CN | 107097247 A | 8/2017 |
| DE | 202012100384 U1 | 5/2013 |

(Continued)

*Primary Examiner* — Ryan J. Walters
(74) *Attorney, Agent, or Firm* — Smartpat PLC

(57) ABSTRACT

A disconnectable adapter for the adaptation of a tool to an industrial robot has a first part and a second part connected detachably to the first part. The adapter is designed with at least two locking parts which engage behind the first part or the second part in a spring-loaded manner and are mounted displaceably or pivotably in the second part or first part behind which the locking parts do not engage. To disconnect the first part and the second part of the adapter from each other, all the locking parts are loaded simultaneously relative to the first part and to the second part or relative to one another by means of an external force applied as a compressive force. With the present disclosure, a disconnectable adapter which can be operated both manually and automatically is developed.

19 Claims, 5 Drawing Sheets

(56) References Cited

U.S. PATENT DOCUMENTS

| | | | |
|---|---|---|---|
| 11,981,022 B2* | 5/2024 | Son | B25J 15/0433 |
| 12,053,880 B2* | 8/2024 | Neemann | B21J 15/142 |
| 2008/0122155 A1* | 5/2008 | Wieland | B25J 15/0475 |
| | | | 269/136 |
| 2020/0016771 A1 | 1/2020 | Son | |
| 2021/0197363 A1 | 7/2021 | Zimmer et al. | |
| 2022/0016755 A1 | 1/2022 | Neemann et al. | |

FOREIGN PATENT DOCUMENTS

| | | |
|---|---|---|
| DE | 102013008952 A1 | 11/2014 |
| DE | 102016115740 A1 | 3/2018 |
| DE | 102017009319 | 4/2019 |
| DE | 102018132990 A1 | 6/2020 |
| DK | 201800149 A1 | 12/2018 |
| WO | 8904893 A1 | 6/1989 |

* cited by examiner

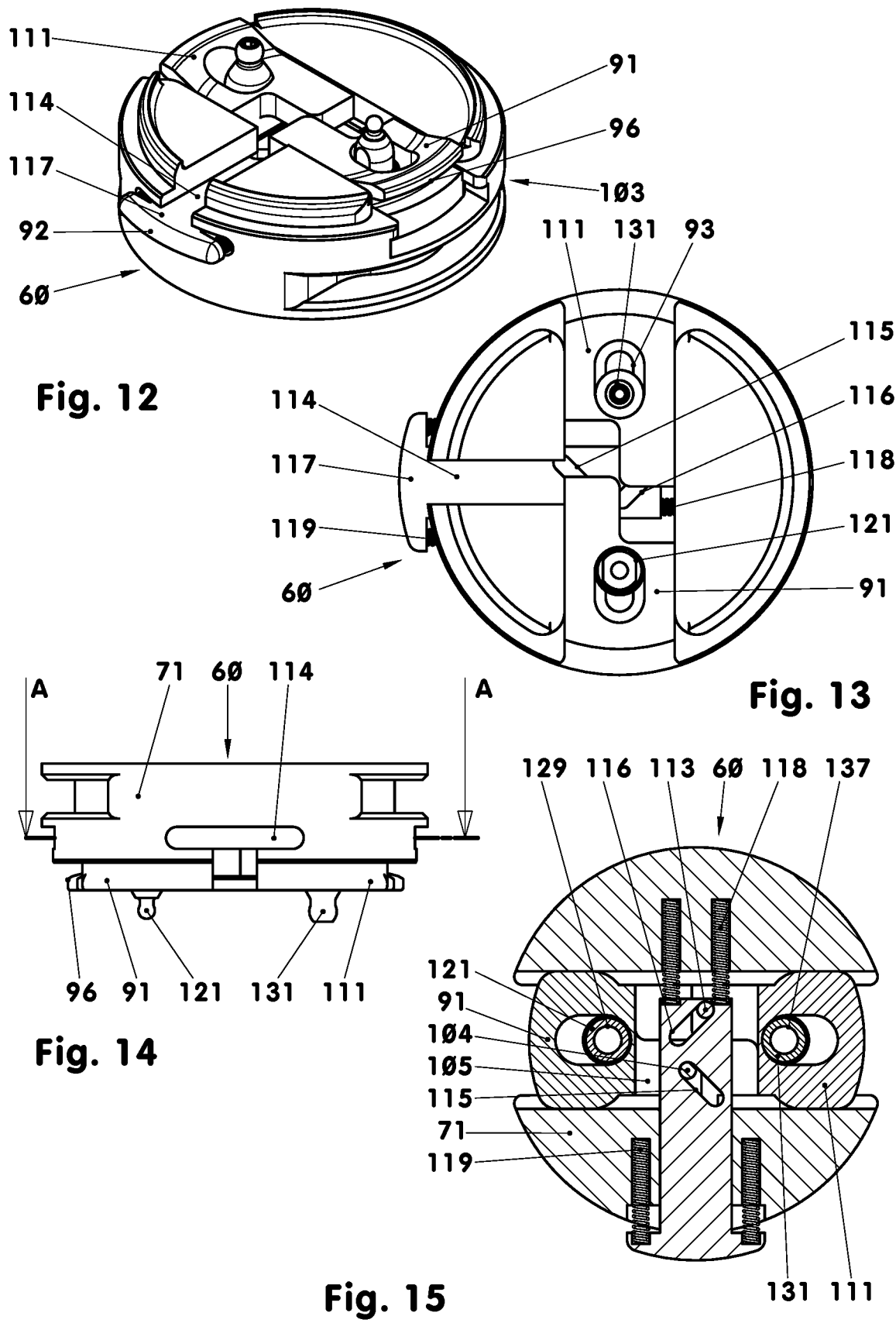

DISCONNECTABLE ADAPTER AND METHOD FOR DISCONNECTION

TECHNICAL FIELD

The disclosure relates to a method for manually or automatically disconnecting a disconnectable adapter having a first part and a second part connected detachably to the first part. The disclosure further relates to a disconnectable adapter for the adaptation of a tool to an industrial robot, having a first part and a second part connected detachably to the first part, wherein at least one spring-loaded locking part is mounted displaceably or pivotably in the second part and at least contacts the first part.

BACKGROUND

An adapter that can be manually operated is known from DK 2018 00149 A1. This is mounted so that it can pivot on one side. Its operating element is secured by means of a clamp connection upon a pivoting closure.

SUMMARY

The present disclosure is based on the problem of developing a disconnectable adapter that can be operated both manually and automatically.

This problem is solved with the features of the main claim. For this purpose, the adapter is designed with at least two spring-loaded locking parts that engage behind the first part or the second part, which locking parts are mounted displaceably or pivotably in the second part or first part behind which the locking parts do not engage. Each of the locking parts engages around a guide element that is arranged in the part supporting the locking part and that engages in a positive-locking manner in a respective guide element receptacle, which is arranged in the part not supporting the locking part. In order to disconnect the first part and the second part of the adapter, all locking parts are loaded simultaneously relative to the first part and the second part or relative to one another by means of an external force applied as a compressive force. Each locking part is displaced or pivoted relative to the first part and the second part by means of such external force, and thereby the load on a spring element loading at least such locking part is additionally increased. Upon such displacement or pivoting of the individual locking part, the rear grip of such locking part with the first part or with the second part detaches. The first part and the second part are disconnected from one another in an assembly direction oriented opposite in a longitudinal direction of the adapter, wherein the guide elements and the guide element receptacles disengage.

In the disconnectable adapter, at least one second, spring-loaded locking part is mounted displaceably or pivotably in the first part or in the second part. Each of the locking parts engages behind the part that does not support such locking part. Each of the locking parts engages around a respective guide element that is arranged in the part supporting the locking part. In addition, each of the guide elements engages in a positive-locking manner in a respective guide element receptacle that is arranged in the part not supporting the locking part.

The disconnectable adapter forms an interface between an industrial robot and, for example, a tool. Thereby, one part, for example the first part, is arranged as a fixed part on the robot side and the other part, for example the second part, is arranged as a removable part on the tool side. In order to disconnect the removable part from the fixed part, both locking parts are loaded directly or indirectly against the spring force acting as the locking force by means of an external force. The removable part can now be removed, for example in the longitudinal direction of the adapter.

In order to connect a removable part with the fixed part, the locking parts are moved to a release position against the spring force. The removable part and the fixed part are moved towards one another, for example in the longitudinal direction of the adapter, until they reach their operating position. When the load is removed from the locking parts, such locking parts are displaced by means of the spring element or elements until they engage behind the fixed part.

The at least two spring-loaded locking parts may be operated independently, in groups or together. The guide elements and the guide element receptacles determine the disassembly and assembly direction. This ensures that all locking parts are operated during both manual and automatic disconnection and joining of the adapter.

Further details of the invention will be apparent from the dependent claims and the following description of schematically illustrated embodiments.

BRIEF DESCRIPTION OF THE DRAWINGS

FIG. 12: Removable part with one actuation;
FIG. 13: Bottom view of the removable part from FIG. 12;
FIG. 14: Side view of the removable part from FIG. 12;
FIG. 15: Section A-A from FIG. 14.

DETAILED DESCRIPTION

Figure 1:
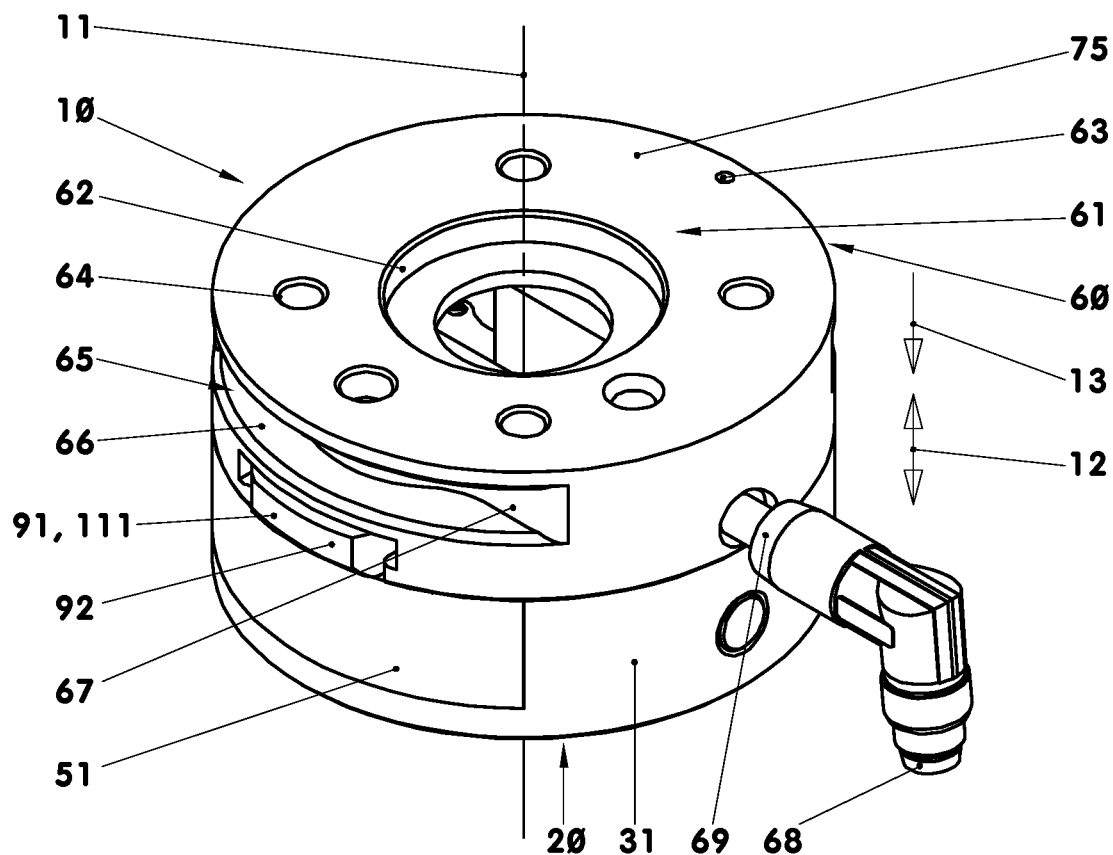
FIG. 1: Disconnectable adapter.

FIGS. 1-11 show a disconnectable adapter (10) and some of its individual parts. Such adapters (10) are used to interchangeably fasten individual tools to an industrial robot. The tools may be handling tools, machining tools, measuring tools, cameras, etc. Handling tools are, for example, gripping tools, pushing tools, drawing tools, etc. These may be electrically, pneumatically or hydraulically operated. Machining tools are, for example, cutting or non-cutting tools, for example milling cutters, drills, saws, bending punches, etc.

The disconnectable adapter (10) has a first part (20) and a second part (60) detachably arranged on the first part (20). The first part (20), which is designed as a fixed part (20), for example, is fastened to a pivot head of an industrial robot. In the exemplary embodiment, a drilling pattern with four fastening bores (21) and a centering bore (22) is used for this purpose. A centering collar (24) with, for exampled a circular cross-sectional area is designed on the end face (23) of the fixed part (20), for example at the bottom. The adapter (10) is centered on the industrial robot by means of such centering collar (24) and a centering pin seated in the centering bore (22).

The tool is fastened to the second part (60), which is designed, for example, as a removable part (60). For this purpose, the removable part (60) has a tool receptacle (62) on its end face (61) and a flat support surface (75), for example. Furthermore, the end face (61) of the removable part (60) has a centering recess (63) and a fastening drilling pattern (64). This allows the tool to be fastened to the removable part (60) by means of screws. In the exemplary embodiment, the end face (23) of the fixed part (20) is complementary to the end face (61) of the removable part (60). As such, it is conceivable to fasten the tool directly to the industrial robot without using the adapter (10).

In the exemplary embodiment, the disconnectable adapter (10) has an at least approximately cylindrical enveloping contour. In the exemplary embodiment, two locking parts (91) protrude from the shell surface of such enveloping contour. Such two locking parts (91) are arranged opposite one another on the removable part (60), for example. They are offset relative to one other in a plane normal to the longitudinal axis of the adapter (10), for example by 180 degrees. A different offset angle of the two locking parts (91) relative to one another is also conceivable. For example, they may be offset relative to one another in a range from 90 degrees to the angle mentioned above. The locking parts (91, 111) have gripping surfaces (92) pointing in a radially outward manner. Such gripping surfaces (92) may be designed to be flat or curved.

Above each locking part (91), the removable part (60) has a gripping recess (65). The individual gripping recess (65) has, for example, a base surface (66) in the shape of a segment of a circle and a constant height. The guide surfaces (67) of both gripping recesses (65) are oriented parallel to one another, at least in some regions.

In the exemplary embodiment, an electrical cable (68) is connected to the removable part (60) by means of a plug (69). This may be used, for example, to exchange control and/or monitoring signals between the industrial robot and the tool.

Figure 2:
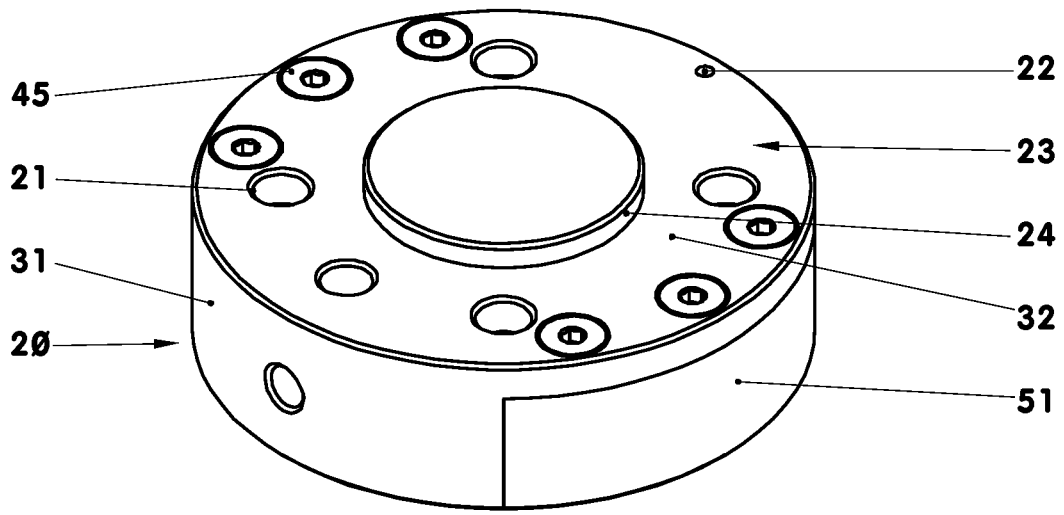
FIG. 2: Bottom view of the fixed part.
Figure 3:
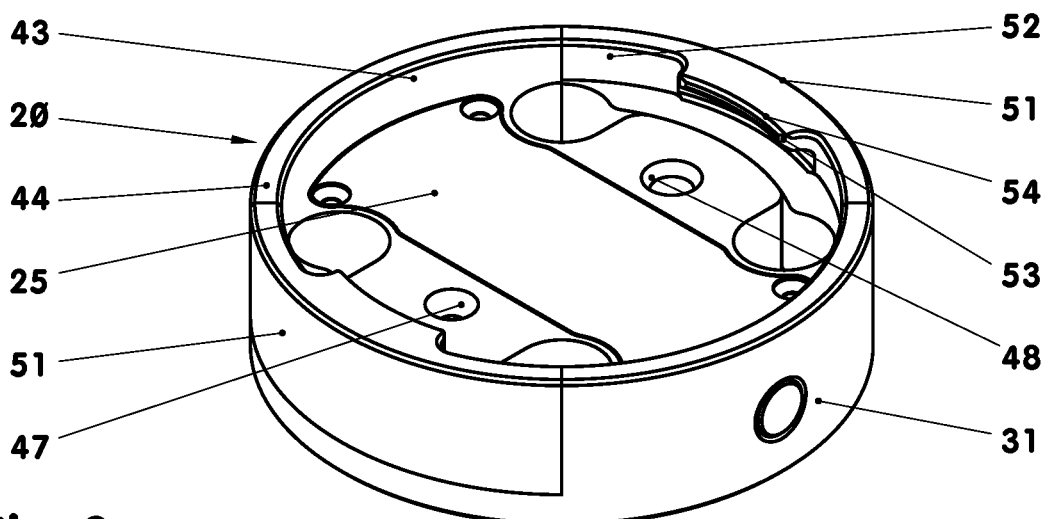
FIG. 3: Top view of the fixed part.

FIGS. 2 and 3 show the fixed part (20) in a top view and in a bottom view. The fixed part (20) is structured in a shell shape and has a cylindrical outer wall. It has a base body (31), see FIG. 4, and two insert pieces (51) inserted into the base body (31), see FIG. 5. A closure lid (25) closes a central region (46) of the fixed part (20).

The base body (31) has a base (32) and two external wall regions (33). Depressions (38) are designed between the wall regions (33) to accommodate the insert pieces (51). In the exemplary embodiment, the two depressions (38) have the same size. Two groups (34) of three counterbores (35) each penetrate the base (32) in addition to the fastening bores (21). Such counterbores (35) open into contact surfaces (36) of the depressions (38). Centering bores (37) are introduced between the counterbores (35).

The wall regions (33) are structured in two levels. The region adjacent to the base (32) is designed as a cylinder jacket (42). An edge bar (43) sits on the cylinder jacket (42). Such edge bar (43) forms part of a ring centering (43, 81). Its side turned away from the base (32) is designed as a flat surface (44). The plane is oriented normal to the longitudinal axis (11).

The two depressions (38) each cover a sector angle of 90 degrees. For example, the boundary surfaces (41) of the depressions (38) oriented in the longitudinal direction (12) are oriented radially with respect to the longitudinal axis (11).

Figure 4:
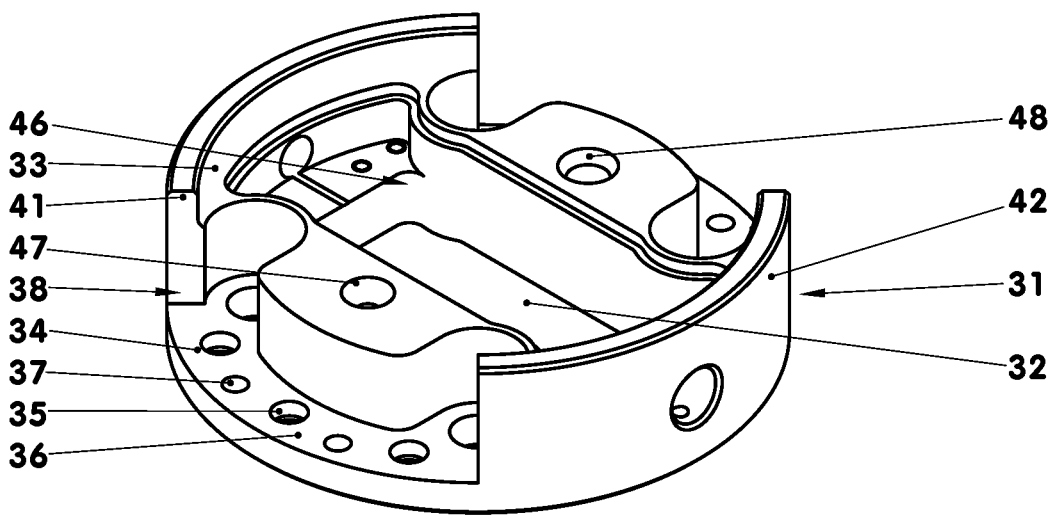
FIG. 4: Base body of the fixed part.
Figure 5:
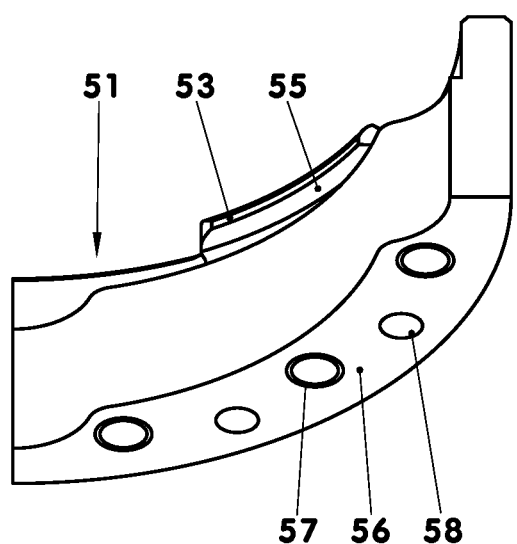
FIG. 5: Insert piece.

The base body (31) also has two guide element receptacles (47, 48) that are arranged off-center. Such guide element receptacles (47, 48) have the same depth, for example. They are oriented parallel to the longitudinal axis (11). The guide element receptacles (47, 48) have different cross-sections. In the illustrations of FIGS. 3 and 4, the guide element receptacle (47) shown on the left has a smaller cross-sectional area than the guide element receptacle (48) shown on the right.

In the exemplary embodiment, the base body (31) is made of aluminum. For example, the modulus of elasticity of such material amounts to 70000 newtons per square millimeter.

In the exemplary embodiment, the two insert pieces (51) are designed to be identical to one another. They have the shape of shell section. In the upper region (52), they have an inwardly directed circumferential edge (53). Such circumferential edge (53) covers a sector of, for example, 36 degrees. Each circumferential edge (53) is designed to be wedge-shaped in cross-section. Its upper side (54) and its lower side (55) enclose an angle of 5 degrees in the exemplary embodiment. The apex line of such angle is oriented in the direction of the longitudinal axis (11). The upper side (54) lies in the plane of the flat surface (44) of the edge bars (43) when the insert pieces (51) are mounted. Outside and below the circumferential edge (53), the inside diameter of the insert pieces (51) corresponds to the inside diameter of the edge (33) of the base body (31). The outer diameter of the insert pieces (51) corresponds to the outer diameter of the base body (31). In their base surface (56), each of the insert pieces (51) has three threaded bores (57) and two centering pin receptacles (58).

In the exemplary embodiment, the insert pieces (51) are made of steel. The modulus of elasticity of such material amounts to 210,000 newtons per square millimeter. Thus, such modulus of elasticity amounts to three times the modulus of elasticity of the base body (31). The materials may be selected so that the modulus of elasticity of the insert pieces (51) amounts to more than twice the modulus of elasticity of the base body (31). It is also conceivable to use the insert pieces (51) as replacement parts. For this purpose, they may be made of a plastic, for example.

When assembling the fixed part (20), each of the insert pieces (51) is inserted into a depression (38). Centering pins and fastening screws (45) inserted in the counterbores (35) hold and secure the insert pieces (51). An electrical assembly, for example, can be inserted into the central region (46) of the base. Such central region (46) is then closed, for example by means of the closure lid (25).

Figure 6:
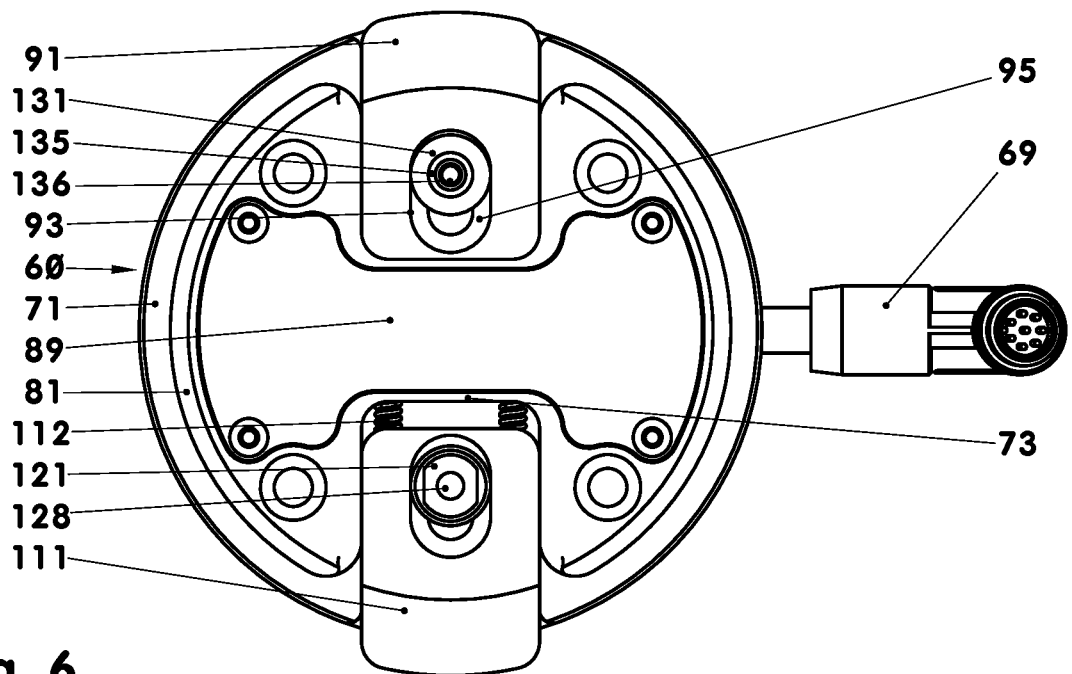
FIG. 6: Bottom view of the removable part.

FIG. 6 shows a bottom view of the removable part (60). The removable part (60) comprises a removable part body (71), two guide elements (121, 131) designed, for example, as guide pins (121, 131), pins or cones, and the two locking parts (91, 111). A cover plate (89) closes the inner side of the tool receptacle (62). The two locking parts (91, 111) are arranged opposite one another. Each of the locking parts (91; 111) is guided in a radially displaceable manner in the removable part body (71) and in a respective guide pin (121; 131). For guidance along the guide pins (121; 131), the individual locking part (91; 111) each has a guide slot (93). Thereby, each of the locking parts (91; 111) is supported by means of two spring elements (112). Such spring elements (112), which are designed, for example, as compression springs (112), each load a locking part (91; 111) in a radially outward manner. Thereby, the spring elements (112) are each supported on a support bar (73) of the removable part body (71).

In the illustration of FIG. 6, the upper locking part (91) is shown pushed in. For example, the gripping surface (92) is nearly flush with the enveloping contour of the removable part (60). Thereby, the compression springs are compressed. The stroke of the locking part (91) is limited by the guide slot (93) and the guide pin (131).

In the illustration of FIG. 6, the lower locking part (111) is displaced outward by means of the compression springs (112). The stroke of the locking part (111) in the outer end position is limited by means of the guide pin (121) and the guide slot (93).

Figure 7:
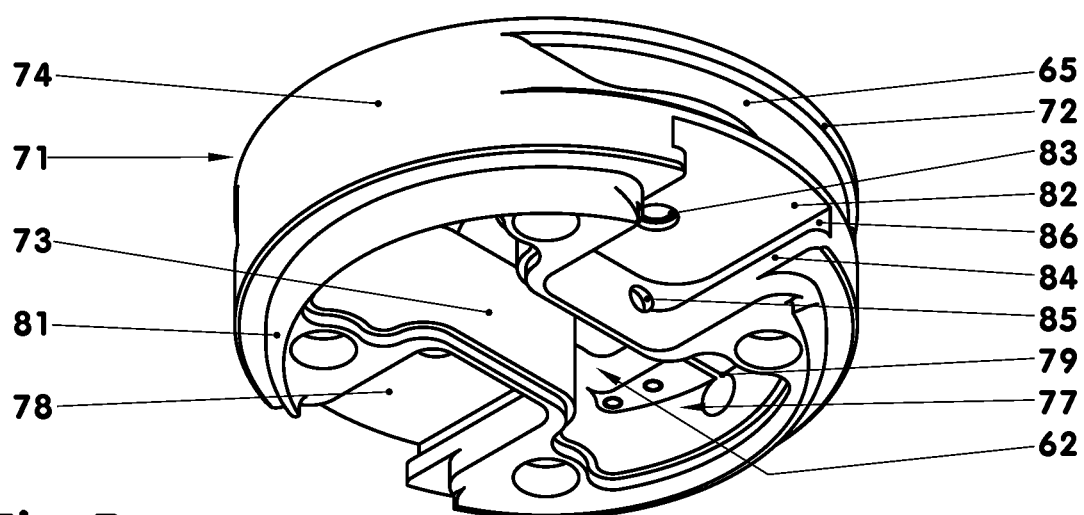
FIG. 7: Removable part body.

FIG. 7 shows the removable part body (71). It has a lid part (72) and a removable part body edge (74). The lid part (72) has a flat support surface (75), see FIG. 1. An opening for the tool receptacle (62) is introduced in it. On the inner side (77), see FIG. 7, the support bars (73) delimit the centrally arranged tool receptacle (62) from two opposite locking part receptacles (78). The removable part body (71) is made of the same material as the base body (31), for example.

A cable duct (79) opens into the tool receptacle (62), to the outer side of which the plug (69) is connected in the illustrations of FIGS. 1 and 6. The tool receptacle (62) is surrounded by the removable part body edge (74). This is designed in two levels. The edge region protruding downward in FIG. 7 is designed as a centering ring (81). When the adapter (10) is assembled, it forms part of a ring centering (43, 81).

Each of the locking part receptacles (78) has a flat sliding surface (82). The two sliding surfaces (82) lie in a common plane. Such plane is parallel to the support surface (75) of the removable part (60). A threaded bore (83) is introduced in each of the sliding surfaces (82). The respective threaded bore (83) is located, for example, centrally between the two longitudinal sides (84) of the locking part receptacle (78). One of the guide pins (121; 131) is screwed into each of such threaded bores (83). Spring receptacles (85) are stamped into the support bars (73). The pressure springs (112) are seated in these when the removable part (60) is mounted. Guide grooves (86) are designed in the longitudinal sides (84) adjacent to the sliding surfaces (82).

Figure 8:
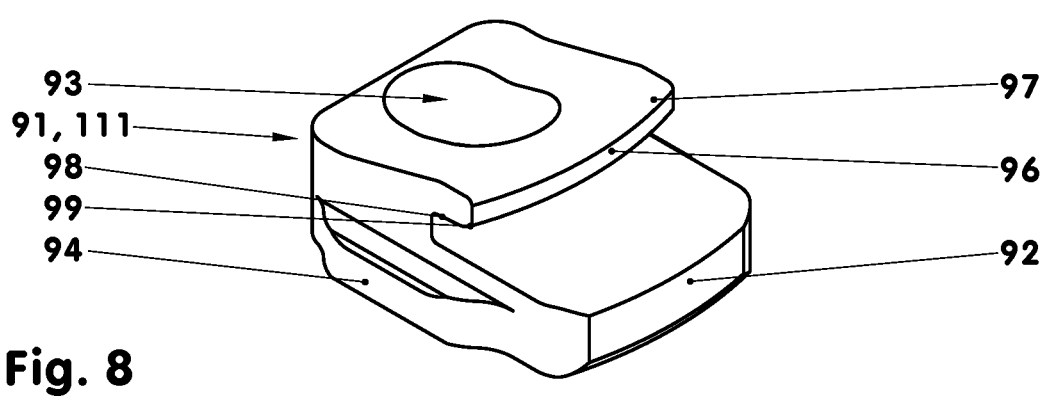
FIG. 8: Locking part.

FIG. 8 shows a locking part (91; 111). In the exemplary embodiment, both locking parts (91; 111) are designed to be identical. However, it is also conceivable to form the two locking parts (91, 111) with different widths, for example. The individual locking part (91; 111) has the central guide slot (93) and two lateral guide strips (94). The guide slot (93) is oriented radially to the longitudinal axis (11) of the adapter (10). The guide strips (94) are parallel to the guide slot (93). When the removable part (60) is mounted, the guide strips (94) are guided in the guide grooves (86). The guide slot (93) engages around the respective guide pin (121; 131). The individual guide slot (93) is designed with a depression (95), see FIGS. 6 and 11.

On its outer side, the locking part (91; 111) has the gripping surface (92). In the illustration of FIG. 8, a projecting hook (96) is arranged above the gripping surface (92) and is spaced therefrom. The gripping surface (92) projects beyond the hook (96) by 30% of the component length measured in the radial direction. The hook (96) is designed in an arc shape in a top view of the locking part (91; 111). The arc length amounts to 38 degrees in a normal plane to the longitudinal axis (11). The hook (96) is designed to be wedge-shaped in cross-section. The wedge angle between the hook upper side (97) and the hook lower side (98) amounts to 5 degrees in the exemplary embodiment. This is also the size of the angle that the hook lower side (98) encloses with a normal plane to the longitudinal axis (11). At its free end, the hook (96) has an insertion chamfer (99) adjacent to the hook lower side (98) of the hook. The angle between the insertion chamfer (99) and the hook upper side (97) amounts to 30 degrees in the exemplary embodiment. On its rear side oriented towards the longitudinal axis (11), the locking part (91; 111) can have spring receptacles. These are designed, for example, like the spring receptacles in the support bars (73). In the exemplary embodiment, the two locking parts (91, 111) are made of the same material as the insert pieces (51).

Figure 9:
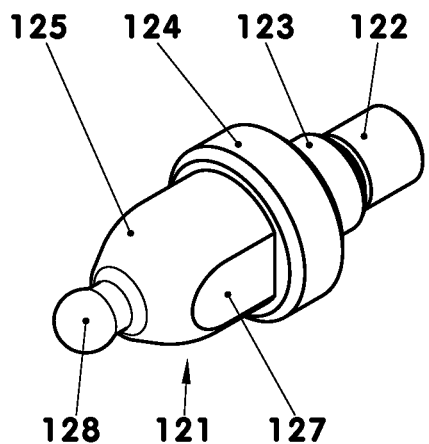
FIG. 9: First guide element.
Figure 10:
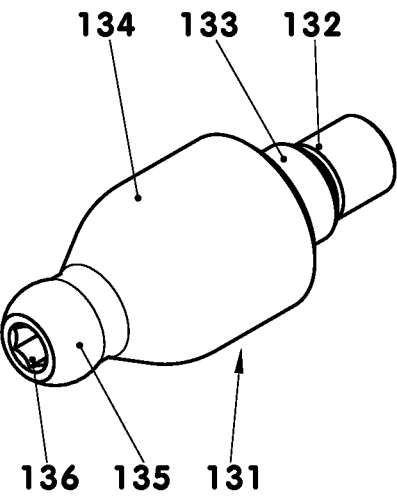
FIG. 10: Second guide element.

FIGS. 9 and 10 show the two guide pins (121, 131) of the exemplary embodiment. The two guide pins (121, 131) have different shapes. The guide pin (121) illustrated in FIG. 9 is referred to below as the first guide pin (121). FIG. 10 then shows the second guide pin (131). The two guide pins (121, 131) have the same length, for example. In the exemplary embodiment, they are made of the same material as the insert pieces (51).

The first guide pin (121) has an external thread (122) whose nominal dimension corresponds to the nominal dimension of the threaded bores (83). A guide collar (123), the diameter of which is larger than the nominal dimension of the threaded bore (83), adjoins the external thread (122). The diameter of the guide collar (123) is smaller than the free width of the guide slot (93). A support collar (124) is adjacent to the guide collar (123). Such support collar (124) prevents, among other things, lifting or tilting of the locking part (91; 111) relative to the removable part body (71) when the locking part (91; 111) is mounted.

An assembly section (125) is adjacent to the support collar (124) of the first guide pin (121). In the exemplary embodiment, this has two mutually parallel key surfaces (127) arranged on its shell surface. A guide pin head (128) adjoins the assembly section (125). In the exemplary embodiment, this is designed in a dome shape.

The second guide pin (131) also has an external thread (132) and a guide collar (133). These are designed like the corresponding regions of the first guide pin (121). The support collar (134) of the second guide pin (131) is designed, for example, as long as the sum of the lengths of the support collar (124) and the assembly section (125) of the first guide pin (121). The guide pin head (135) of the second guide pin (131) is also designed in a dome shape. However, its diameter is larger than the diameter of the guide pin head (128) of the guide pin (121) illustrated in FIG. 9. The second guide pin (131) has an internal hexagon (136) on its end face.

When assembling the removable part (60), the spring elements (112) are inserted into the spring receptacles (85) of the removable part body (71) and the locking parts (91; 111). The locking parts (91, 111) are pushed into the locking part receptacles (78), wherein the guide strips (94) are guided in the guide grooves (86). Thereby, the spring elements (112) are compressed.

A guide pin (121; 131) is inserted into the individual locking part (91; 111). This is pushed through the guide slot (93) of the locking part (91; 111) and screwed into the associated threaded bores (83). After the locking parts (91, 111) are released, they are pushed outward by means of the spring elements (112). The hook (96) of the individual locking part (91; 111) points outward. The cover plate (89) is fastened in the removable part body (71) and the plug (69) is mounted on the outer side of the removable part body (71). Finally, a tool can be inserted into and fastened to the removable part (60).

In order to join the adapter (10), the removable part (60) is connected to the fixed part (20). This can be done manually or by means of a gripping device. Both locking parts (91, 111) are pressed in, thus gripping the removable part (60). When using a gripping device, the removable part (60) can additionally be held at the gripping recesses (65). The removable part (60) is placed against the fixed part (20) in such a manner that the insert pieces (51) and the locking parts (91; 111) are on top of one another and the centering ring (81) of the removable part (60) is inside the edge bar (43) of the fixed part (20). As the removable part (60) approaches the fixed part (20) further in the assembly direction (13) oriented in the longitudinal direction (12), the guide pins (121, 131) immerse into the guide pin receptacles (47, 48) of the fixed part (20). Due to the different geometric formation of the two guide pins (121, 131) and the associated guide pin receptacles (47, 48), the removable part (60) can only be pushed onto the fixed part (20) in one position. Other structural solutions for ensuring the radial orientation of the removable part (60) relative to the fixed part (20) are also conceivable. Once the guide pins (121, 131) are immersed in the guide pin receptacles (47, 48), no further displacement of the removable part (60) relative to the fixed part (20) in the assembly direction (13) is possible. The guide pins (121, 131) inserted in the guide pin receptacles (47, 48) center the removable part (60) relative to the fixed part (20) in a positive-locking manner.

Figure 11:
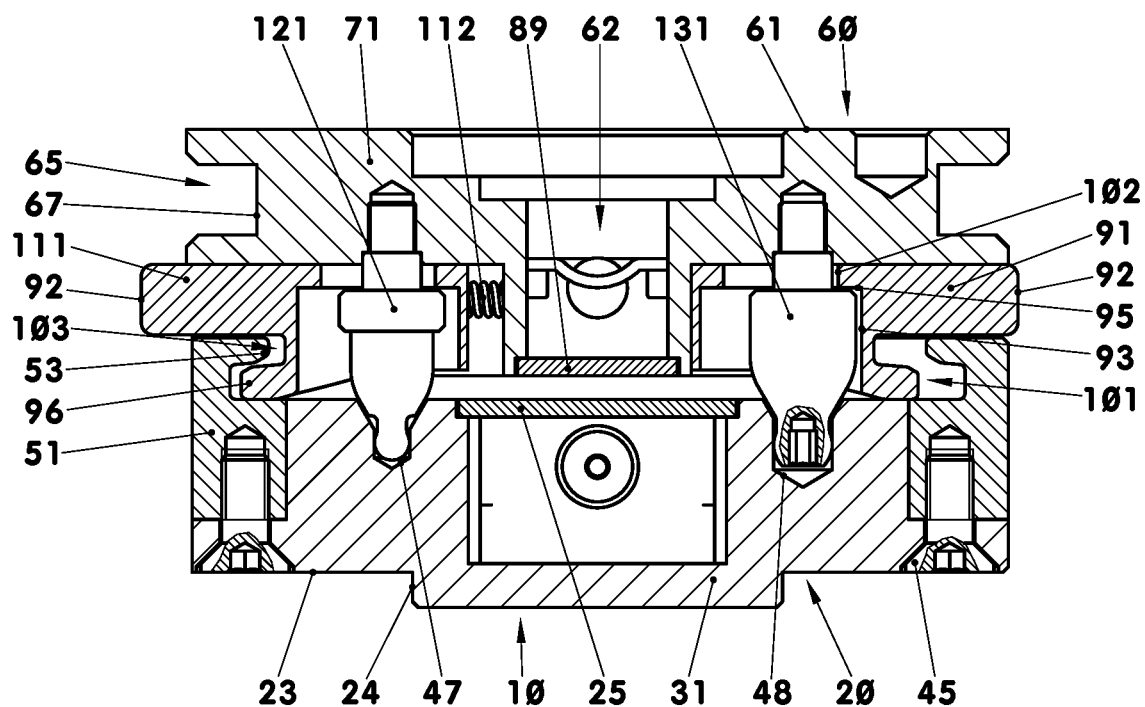
FIG. 11: Cross-section of the adapter through the locking parts.

FIG. 11 shows a sectional view of the adapter (10) during assembly. The two guide pins (121, 131) are seated in the guide pin receptacles (47, 48). The right closure part (91) is shown in the release position (101). Such right closure piece (91) rests with its release stop (102) against the guide pin (131). The hook (96) lies within the cylinder section bounded by the circumferential edge (53).

When the locking parts (91, 111) are released, they are displaced outward by means of the spring elements (112). Thereby, the hook (96) moves to the circumferential edge (53). The hook (96) slides with its hook lower side (98) along the lower side (55) of the circumferential edge (53). The two wedges pull the removable part (60) and the fixed part (20) further together in the assembly direction (13). In the illustration of FIG. 11, the left closure piece (111) is in the locking position (103). The hook (96) engages behind the circumferential edge (53). The removable part (60) is secured relative to the fixed part (20) in a force-fitting and positive-locking manner.

With the joining of the adapter (10), the fixed part (20) can also be pneumatically joined to the removable part (60), for example. For example, elastically deformable pneumatic connections, which are compressed during joining, may be used for this purpose. It is also conceivable to route the pneumatic connection through the guide pins (121; 131). Moreover, when joining the adapter (10), electrical and/or hydraulic lines, for example, may be connected together within the adapter (10). This may then be used, for example, to transmit load current, signals, data, hydraulic medium, etc., see DE 10 2017 009 319 B3.

During operation of the tool arranged on the adapter (10), the operating forces are transmitted via the adapter (10). In the axial direction, the forces are transmitted via the guide pins (121, 131). In this case, such axial forces are transmitted from the guide collars (123, 133) via the guide pin heads (128, 135) into the base (32) of the fixed part (20).

Transverse forces on the tool are also transmitted via the guide pins (121, 131). Such forces are also transmitted via the locking parts (91, 111) and, if necessary, also via the ring centering (43, 81).

Torques between the fixed part (20) and the removable part (60) are substantially transmitted via the guide pins (121, 131). The friction of the force-fitting connection between the locking parts (91, 111) and the circumferential edges (53) also contributes to the torque transmission.

To change the tool, the adapter (10) is disconnected. This can be done manually or automatically.

During a manual tool change, the operator presses the two locking parts (91, 111) inward. The locking parts (91, 111) detach from the circumferential edges (53). The tool can now be removed together with the removable part (60) from the fixed part (20) against the assembly direction (13). For example, it is stored in a magazine. Thereby, the removable part (60) can be held in the gripping recesses (65). A new tool with a removable part (60) arranged thereon can then be removed from the magazine. Assembly on the fixed part (20) is carried out as described above.

In the case of an automatic tool change, the removable part (60) can initially be held in the gripping recesses (65) by means of a rigid fork gripper, for example. A gripper with movable gripper jaws presses the two locking parts (91, 111) relative to one another. Disconnecting the removable part (60) from the fixed part (20) is carried out as described above. In this case as well, the removed tool with the removable part (60) fastened to it can be inserted into a magazine. After inserting the removable part (60) into the magazine, the gripper jaws of the gripper are relieved. The locking parts (91, 111) of the removable part (60) move to their extended home position. The new tool with a removable part (60) fastened to it can also be removed from the magazine by means of the gripper with movable gripper jaws. When gripping the removable part (60), the gripping jaws press the locking parts (91, 111) together. The removable part (60) with the workpiece fastened to it is placed against the fixed part (20), as described above. After the removable part (60) has reached the stop on the fixed part (20) with the locking parts (91, 111) pressed in, the gripper jaws are relieved. The locking parts (91, 111) engage behind the circumferential edges (53) and secure the removable part (60) to the fixed part (20).

For an automatic or a manual tool change, the adapter (10) can also be pushed into an unlocking receptacle. This engages in the gripping or guiding recess (65), for example. The unlocking receptacle is designed to be wedge-shaped, for example. When the adapter (10) is pushed into the unlocking receptacle, the two locking parts (91, 111) are operated. Thereby, the operating elements (91, 111) may be slightly offset from one another or arranged offset relative to one another by up to a semicircle angle. Disconnection of the first part (20) and the second part (60) is then carried out as described above.

The locking parts (91, 111) can also be operated, for example, from one of the end faces (23, 24). For example, the locking parts (91, 111) are thereby displaced inwards when wedge gate valves are pressed in. In such a case, the external force is transmitted to the locking parts (91, 111) by means of a wedge gear. Disconnection of the first part (20) and the second part (60) is then carried out as described above.

The actuation of the unlocking can take place by means of a individual pushbutton. When such button is pressed in, all locking parts (91, 111) are displaced simultaneously under additional load of the spring elements (112). Thereby, the respective positive-locking rear grips are detached.

FIGS. 11-15 show a variant of a removable part (60) with two locking parts (91, 111), which can be operated together by means of a button (114). The outer dimensions of the removable part (60) correspond to the outer dimensions of the removable part (60) shown in FIG. 6. For example, the removable part (60) shown in FIGS. 11-15 can be combined with the fixed part (20) shown in FIGS. 2 and 3.

The two locking parts (91, 111) are each displaceably mounted in the removable part (60) and guided by means of the guide elements (121, 131) fastened in the removable part (60). The guide elements (121, 131) are hollow, for example, with an internal duct (129, 137). The respective guide slot (93) and the hooks (96) are designed as described in connection with the first exemplary embodiment. Each of the locking parts (91; 111) has a drive pin (104; 113), each of which engages a drive slot (115; 116) of the button (114). The individual drive pin (104; 113) sits on a bar (105) of the locking part (91; 111).

The button (114) has a gripping part (117) projecting in a radially outward manner from the removable part (60) and having a gripping surface (92). In the exemplary embodiment, it is loaded into the extended position by means of four spring elements (118, 119). Two of such spring elements (118), designed as compression springs (118), support the body of the button (114) against the removable part body (71). The other two spring elements (119), also designed as compression springs (119), are arranged between the removable part body (71) and the gripping part (117). In the exemplary embodiment, the two drive slots (115, 116) are arranged in a V-shape relative to one another. The angle enclosed by the two drive slots (115, 116) amounts to 90 degrees, for example. Each of the drive pins (104, 113) is located at the end of the drive slot (115, 116) turned towards the hook (96).

In the locking position (103) shown, the spring elements (118, 119) press both locking parts (91, 111), for example, in a radially outward manner, via the positive guidance (104, 115; 113, 116) of the drive slots (115, 116) and the drive pins (104, 113). All compression springs (118, 119) are partially loaded and partially compressed compared with their relaxed state. If the button (114) is pushed in by means of an external compressive force, the load on the compression springs (118, 119) is increased. The button (114) displaces both locking parts (91, 111) towards the center via the positive guides (104, 115; 113, 116). For example, the hooks (96) of the locking mechanism are detached. After the removal of the manually or automatically applied external force, the locking parts (91, 111) are moved back into the locking position (103) under spring load.

The individual spring-loaded locking part (91; 111) can also engage behind the fixed part (20) or the removable part (60) in a pivoting movement, for example about the longitudinal axis (11). Thereby, at least two locking parts (91, 111) have the same pivot direction. The locking parts (91; 111) may, for example, be rigidly connected to one another and jointly loaded by means of a spring element (112) for locking. In this exemplary embodiment as well, each locking part (91; 111) engages around a respective guide element (121; 131). During pivoting, the operating element (91; 111) is guided along such guide element (121; 131). To detach the lock, a compressive force is applied to either one or more buttons. The transmission of the forces to the individual locking parts (91; 111) takes place as described above.

The actuation can also be carried out by means of a disk segment with an outwardly protruding nose that can be pivoted about the longitudinal axis (11), for example. This can be part of or operate a spring-loaded locking part (91, 111). It is also conceivable to operate both locking parts (91, 11) by means of a individual disk segment.

In all variants, the interposition of an electric drive and/or a gear is also conceivable.

It is also conceivable to form the adapter (10) in such a manner that a locking part (91; 111) and the associated guide element (121) are mounted in the first part (20) or in the second part (60). The second locking part (111; 91) and the associated guide element (131) are then mounted in the respective other part (60; 20). Accordingly, the guide element receptacles (47, 48) are arranged in the part (60; 20) in which the allocated guide element (121; 131) is not fastened.

The adapter (10) can also be designed with more than two locking parts (91, 111). A locking part (91, 111) mounted and guided in the fixed part (20) then engages behind the removable part (60). A locking part (91; 111) mounted and guided in the removable part (60) engages behind the fixed part (20). Each of the locking parts (91, 111) is guided by means of a guide element (121; 131) and is spring-loaded individually, in groups or together with the other locking parts (91, 111) in the locking direction.

Combinations of the individual exemplary embodiments are also conceivable.

LIST OF REFERENCE SIGNS

10 Disconnectable adapter
11 Longitudinal axis
12 Longitudinal direction
13 Assembly direction of (60) relative to (20)
20 Fixed part, first part
21 Fastening bores
22 Centering bore
23 End face, lower side
24 Centering collar
25 Closure lid
31 Base body
32 Base
33 Edges, wall regions
34 Groups of counterbores
35 Counterbores
36 Contact surfaces
37 Centering bores
38 Depressions
41 Boundary surfaces
42 Cylinder jacket
43 Edge bar, part of ring centering (43, 81)
44 Flat surface
45 Fastening screws
46 Central region
47 Guide element receptacle
48 Guide element receptacle
51 Insert pieces
52 Upper region of (51)
53 Circumferential edge
54 Upper side of (53)
55 Lower side of (53)
56 Bottom surface
57 Threaded bores
58 Centering pin receptacles
60 Removable part, second part
61 End face
62 Tool receptacle
63 Centering recess
64 Fastening drilling pattern
65 Gripping or guiding recess
66 Base surface
67 Guiding surfaces
68 Electrical cable
69 Plug
71 Removable part body 72 Lid part
73 Support bar
74 Removable part body edge
75 Support surface
77 Inner side
78 Locking part receptacles
79 Cable duct
81 Centering ring, part of ring centering (43, 81)
82 Sliding surfaces
83 Threaded bore
84 Longitudinal sides
85 Spring receptacles
86 Guide grooves
89 Cover plate
91 Locking parts
92 Gripping surfaces
93 Guide slot
94 Guide strips
95 Depression
96 Hook
97 Hook upper side
98 Hook lower side
99 Insertion chamfer
101 Release position
102 Release stop
103 Locking position
104 Drive pin, part of positive guidance (104, 115)
105 Bar
111 Locking part
112 Spring elements, compression springs
113 Drive pin, part of positive guidance (113, 116)
114 Pushbutton
115 Drive slot, part of positive guidance (104, 115)
116 Drive slot, part of positive guidance (113, 116)
117 Gripping part
118 Spring elements, compression springs
119 Spring elements, compression springs
121 Guide element, first guide element, guide pin
122 External thread
123 Guide collar
124 Support collar
125 Assembly section
127 Key surface
128 Guide pin head
129 Duct
131 Guide element, second guide element, guide element
132 External thread
133 Guide collar
134 Support collar
135 Guide pin head
136 Internal hexagon
137 Duct

The invention claimed is:

1. A method for manually or automatically disconnecting a disconnectable adapter (10) having
   a first part (20), and
   a second part (60) connected detachably to the first part (20),
   with at least two locking parts (91; 111) that engage behind the first part (20) or the second part (60) in a spring-loaded manner and are mounted displaceably or pivotably in the second part (60) or first part (20) behind which the locking parts do not engage,
   wherein each of the at least two locking parts (91; 111) engages around a respective guide element (121; 131) that is arranged in the respective part (20; 60) supporting the locking part (91, 111) and that engages in a positive-locking manner in a respective guide element receptacle (47; 48), which is arranged in the respective part (20; 60) not supporting the locking part (91; 111),
   the method comprising:
   simultaneously loading the at least two locking parts (91, 111) relative to the first part (20) and to the second part (60) or relative to one another by an external force applied as a compressive force;
   displacing or pivoting each of the at least two locking parts (91, 111) relative to the first part (20) and to the second part (60) by the external force, and thereby additionally increasing a load on a spring element (112, 118, 119) loading the at least two locking parts (91, 111);
   detaching a rear grip of a respective locking part (91; 111) with the first part (20) or with the second part (60) upon the displacing or pivoting of the respective locking part (91; 111); and
   disconnecting the first part (10) and the second part (60) from one another in an assembly direction (13) oriented opposite to a longitudinal direction (12) of the adapter (10), whereby the guide elements (121; 131) and the guide element receptacles (47, 48) disengage.

2. A disconnectable adapter (10) for the adaptation of a tool to an industrial robot, comprising:
   a first part (20);
   a second part (60) connected detachably to the first part (20);
   a first spring-loaded locking part (91) mounted displaceably or pivotably in the second part (60), which contacts the first part (20); and
   a second spring-loaded locking part (111) mounted displaceably or pivotably in the second part (60),
   wherein each of the locking parts (91, 111) engages behind the second part (60),
   wherein each of the locking parts (91; 111) engages around a respective guide element (121; 131) that is arranged in the first part (20), and
   wherein each of the guide elements (121; 131) engages in a positive-locking manner in a respective guide element receptacle (47; 48) that is arranged in the second part (60).

3. The disconnectable adapter (10) according to claim 2, wherein the guide elements (121, 131) have different shapes.

4. The disconnectable adapter (10) according to claim 2, wherein the spring-loaded locking part (91; 111) and the second spring-loaded locking part (111; 91) are offset relative to one another in a plane normal to a longitudinal axis (11) of the adapter (10).

5. The disconnectable adapter (10) according to claim 2, wherein the first part (20) and/or the second part (60) has a base body (31) and an insert piece (51) forming an edge section.

6. The disconnectable adapter (10) according to claim 5, wherein a modulus of elasticity of the insert piece (51) is at least twice a modulus of elasticity of the base body (31).

7. The disconnectable adapter (10) according to claim 2, further comprising
   an external gripping surface (92) for operating the locking parts (91, 111), which protrudes in a radial direction beyond an enveloping contour of the first part (20) and/or the second part (60).

8. The disconnectable adapter (10) according to claim 2, wherein the first part (20) and/or the second part (60) has gripping or guiding recesses (65) on its shell surface.

9. The disconnectable adapter (10) according to claim 2, wherein a ring centering (43, 81) is designed in a parting line between the first part (20) and the second part (60).

10. The disconnectable adapter (10) according to claim 2, wherein two end faces (23, 61) are designed in a manner complementary to one another.

11. A disconnectable adapter (10) for the adaptation of a tool to an industrial robot, comprising:
- a first part (20);
- a second part (60) connected detachably to the first part (20);
- a first spring-loaded locking part (91) mounted displaceably or pivotably in the second part (60), which contacts the first part (20); and
- a second spring-loaded locking part (111) mounted displaceably or pivotably in the first part (20),
- wherein the first locking part (91) engages behind the first part (20),
- wherein the second locking part (111) engages behind the second part (60),
- wherein the first locking part (91) engages around a first guide element (131) that is arranged in the second part (60),
- wherein the second locking part (111) engages around a second guide element (121) that is arranged in the first part (20),
- wherein the first guide element (131) engages in a positive-locking manner in a first guide element receptacle (48) arranged in the first part (20), and
- wherein the second guide element (121) engages in a positive-locking manner in a second guide element receptacle (47) arranged in the second part (60).

12. The disconnectable adapter (10) according to claim 11, wherein the guide elements (121, 131) have different shapes.

13. The disconnectable adapter (10) according to claim 11, wherein the spring-loaded locking part (91; 111) and the second spring-loaded locking part (111; 91) are offset relative to one another in a plane normal to a longitudinal axis (11) of the adapter (10).

14. The disconnectable adapter (10) according to claim 11, wherein the first part (20) and/or the second part (60) has a base body (31) and an insert piece (51) forming an edge section.

15. The disconnectable adapter (10) according to claim 14, wherein a modulus of elasticity of the insert piece (51) is at least twice a modulus of elasticity of the base body (31).

16. The disconnectable adapter (10) according to claim 11, further comprising an external gripping surface (92) for operating the locking parts (91, 111), which protrudes in a radial direction beyond an enveloping contour of the first part (20) and/or the second part (60).

17. The disconnectable adapter (10) according to claim 11, wherein the first part (20) and/or the second part (60) has gripping or guiding recesses (65) on its shell surface.

18. The disconnectable adapter (10) according to claim 11, wherein a ring centering (43, 81) is designed in a parting line between the first part (20) and the second part (60).

19. The disconnectable adapter (10) according to claim 11, wherein two end faces (23, 61) are designed in a manner complementary to one another.

* * * * *